United States Patent
Dayal et al.

(10) Patent No.: US 12,505,042 B2
(45) Date of Patent: Dec. 23, 2025

(54) SYSTEMS AND METHODS FOR DISTRIBUTING WORK BETWEEN A HOST AND AN ACCELERATOR USING A SHARED MEMORY

(71) Applicant: Samsung Electronics Co., Ltd., Suwon-si (KR)

(72) Inventors: Jai Dayal, Aloha, OR (US); Douglas Joseph, Leander, TX (US); Samantika Sury, Westford, MA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/491,183

(22) Filed: Oct. 20, 2023

(65) Prior Publication Data
US 2024/0330188 A1    Oct. 3, 2024

Related U.S. Application Data

(60) Provisional application No. 63/455,542, filed on Mar. 29, 2023.

(51) Int. Cl.
G06F 12/00    (2006.01)
G06F 9/54     (2006.01)
G06F 12/084   (2016.01)

(52) U.S. Cl.
CPC .......... *G06F 12/084* (2013.01); *G06F 9/544* (2013.01)

(58) Field of Classification Search
CPC ....... G06F 12/084; G06F 12/544; G06F 9/544
See application file for complete search history.

(56) References Cited

U.S. PATENT DOCUMENTS

| | | | |
|---|---|---|---|
| 9,575,807 B2 | 2/2017 | Murphy | |
| 9,916,259 B1* | 3/2018 | Nordin | G06F 12/0891 |
| 11,048,447 B2 | 6/2021 | Qureshi et al. | |
| 11,550,585 B2 | 1/2023 | Rusitoru et al. | |
| 2014/0351519 A1* | 11/2014 | Munoz | G06F 12/084 |
| | | | 711/122 |
| 2019/0317802 A1 | 10/2019 | Bachmutsky et al. | |
| 2021/0111863 A1* | 4/2021 | Trivedi | H04L 9/0894 |
| 2021/0149821 A1 | 5/2021 | Cui et al. | |
| 2022/0100526 A1 | 3/2022 | Guilford et al. | |
| 2022/0100579 A1 | 3/2022 | Lal et al. | |
| 2022/0188155 A1* | 6/2022 | Miniskar | G06F 9/5066 |

(Continued)

FOREIGN PATENT DOCUMENTS

WO    WO 2018/063717 A1    4/2018

OTHER PUBLICATIONS

Extended European Search Report for EP Application No. 24 166 800.3 dated Jul. 15, 2024, 9 pages.

(Continued)

*Primary Examiner* — Craig S Goldschmidt
(74) *Attorney, Agent, or Firm* — Womble Bond Dickinson (US) LLP (57) ABSTRACT

Provided is a method for data processing, the method including generating, by a host, a work request in a queue in a shared memory, reading, by an accelerator circuit, the work request from the queue in the shared memory, the shared memory being a physical memory that is common to the host and the accelerator circuit, and performing, by the accelerator circuit, an operation on data in the shared memory based on the work request.

20 Claims, 2 Drawing Sheets

(56) References Cited

U.S. PATENT DOCUMENTS

2022/0198071 A1* 6/2022 Doshi .................. G06F 21/606
2023/0069152 A1 3/2023 Akkawi et al.
2023/0385102 A1* 11/2023 Nandan .............. G06F 9/30189

OTHER PUBLICATIONS

Kornaros, et al. "Enabling Efficient Job Dispatching in Accelerator-extended Heterogenous Systems with Unified Address Space," 2018 30$^{th}$ International Symposium on Computer Architecture and High Performance Computing, 2018, pp. 180-188.

Shantharama, et al. "Hardware-Accelerated Platforms and Infrastructures for Network Functions: A Survey of Enabling Technologies and Research Studies," IEEE Access, vol. 8, 2020, pp. 132021-132085.

Tomoutzoglou, et al. "Efficient Job Offloading in Heterogeneous Systems Through Hardware-Assisted Packet-Based Dispatching and User-Level Runtime Infrastructure," IEEE Transactions on Computer-Aided Design of Integrated Circuits and Systems, 39 (5), May 2020, pp. 1017-1030.

* cited by examiner

SYSTEMS AND METHODS FOR DISTRIBUTING WORK BETWEEN A HOST AND AN ACCELERATOR USING A SHARED MEMORY

CROSS-REFERENCE TO RELATED APPLICATION(S)

This application claims priority to, and benefit of, U.S. Provisional Application Ser. No. 63/455,542, filed on Mar. 29, 2023, entitled "LOW-LATENCY COMPUTE KERNEL OFFLOAD AND DATA MOVEMENT IMPLEMENTATION FOR TIGHTLY COUPLED CPUS AND ACCELERATORS," the entire content of which is incorporated herein by reference.

FIELD

Aspects of some embodiments of the present disclosure relate to systems and methods for data processing (e.g., data acceleration).

BACKGROUND

In the field of data processing, a system may include a host and one or more accelerators (e.g., accelerator circuits). The accelerators may include graphics processing units (GPUs). The accelerators may be connected to (e.g., communicably coupled to) the host. The accelerators may be configured to process data for applications running on the host. Such computer data processing systems have become increasingly popular, in part, for allowing the computing resources of the system to be distributed between the host and the accelerators. Data processing workloads have increased over time as the amount of data processed by users of such systems and the number and complexity of applications running on such systems have increased.

The above information disclosed in this Background section is for enhancement of understanding of the background of the present disclosure, and therefore, it may contain information that does not constitute prior art.

SUMMARY

One or more embodiments of the present disclosure are directed to computing systems, and may provide improvements to data processing (e.g., data acceleration).

According to some embodiments of the present disclosure, there is provided a method for data processing, the method including generating, by a host, a work request in a queue in a shared memory, reading, by an accelerator circuit, the work request from the queue in the shared memory, the shared memory being a physical memory that is common to the host and the accelerator circuit, and performing, by the accelerator circuit, an operation on data in the shared memory based on the work request.

A latency associated with processing the data in the shared memory by the host and by the accelerator circuit may be less than a total latency associated with processing the data, by the host, in a first location associated with the host and processing the data, by the accelerator circuit, in a second location associated with the accelerator circuit.

The work request may include a pointer indicating a location of a function in the shared memory, the function being associated with the operation, and the accelerator circuit may perform the function to process the work request.

The work request may include a pointer indicating a location of the data in the shared memory, and the accelerator circuit may perform the function on the data to process the work request.

The work request may include a compute kernel.

The shared memory may include cacheable memory including high-bandwidth memory (HBM).

The accelerator circuit may be a first accelerator circuit of two or more accelerator circuits that process work requests generated by the host, and the method may further include processing, by the host, work-request result data from the first accelerator circuit, and processing, by the host, work-request result data from a second accelerator circuit of the two or more accelerator circuits.

The method may further include generating, by the accelerator circuit, a completion notification in the shared memory.

The method may further include processing, by the host, a reverse offload request from the accelerator circuit based on the work request being associated with at least one of branchy code, a system call, an exception, or a network message.

According to some other embodiments of the present disclosure, there is provided a system for data processing, including a host, an accelerator circuit, and a shared memory communicably coupled to the host and to the accelerator circuit, wherein the host is configured to generate a work request in a queue in the shared memory, the accelerator circuit is configured to read the work request from the queue in the shared memory, the shared memory being a physical memory that is common to the host and the accelerator circuit, and the accelerator circuit is configured to perform an operation on data in the shared memory based on the work request.

The work request may include a pointer indicating a location of a function in the shared memory, the function being associated with the operation, and the accelerator circuit may perform the function to process the work request.

The work request may include a pointer indicating a location of the data in the shared memory, and the accelerator circuit may perform the function on the data to process the work request.

The work request may include a compute kernel.

The shared memory may include cacheable memory including high-bandwidth memory (HBM).

The accelerator circuit may be a first accelerator circuit of two or more accelerator circuits that process work requests generated by the host, and the host may be configured to process work-request result data from the first accelerator circuit, and process work-request result data from a second accelerator circuit of the two or more accelerator circuits.

The accelerator circuit may be configured to generate a completion notification in the shared memory.

The host may be configured to process a reverse-offload request from the accelerator circuit based on the work request being associated with at least one of branchy code, a system call, an exception, or a network message.

According to some other embodiments of the present disclosure, there is provided a device for data processing, including a processing circuit, and memory storing instructions, which, when executed by the processing circuit, cause the processing circuit to perform reading a work request, generated by a host, from a queue in a shared memory, the shared memory being a physical memory that is common to a host and the processing circuit, and performing an operation on data in the shared memory based on the work request.

The work request may include a pointer indicating a location of a function in the shared memory, the function being associated with the operation, and the processing circuit may perform the function to process the work request.

The work request may include a pointer indicating a location of the data in the shared memory, and the processing circuit may perform the function on the data to process the work request.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Aspects of the present disclosure and methods of accomplishing the same may be understood more readily by reference to the detailed description of one or more embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey aspects of the present disclosure to those skilled in the art. Accordingly, description of processes, elements, and techniques that are not necessary to those having ordinary skill in the art for a complete understanding of the aspects and features of the present disclosure may be omitted.

Unless otherwise noted, like reference numerals, characters, or combinations thereof denote like elements throughout the attached drawings and the written description, and thus, descriptions thereof will not be repeated. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown to facilitate a less obstructed view of these various embodiments and to make the description clear.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items. For example, the expression "A and/or B" denotes A, B, or A and B.

For the purposes of this disclosure, expressions such as "at least one of," when preceding a list of elements, modify the entire list of elements and do not modify the individual elements of the list. For example, "at least one of X, Y, or Z," "at least one of X, Y, and Z," and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computing (e.g., high-performance computing (HPC)), a system may include a host and one or more accelerators (e.g., one or more accelerator circuits) communicably coupled to the host. Such a system may be referred to as a "host-accelerator complex" or a "host-accelerator system." The accelerators may be configured to process data for applications running on the host. For example, a central processing unit (CPU) of the host, on which the applications run, may distribute (e.g., offload) work to the accelerators. The accelerators may be capable of performing some data-processing operations more efficiently than the CPU. The CPU may be capable of performing some data processing operations more efficiently than the accelerators. Some host-accelerator systems may have latencies associated with the distribution of work and processing of data between the host and the accelerators. Aspects of some embodiments of the present disclosure provide host-accelerator systems having reduced latencies based on the use of a shared memory (e.g., a shared physical memory) that is common to the host and the accelerators.

Figure 1:
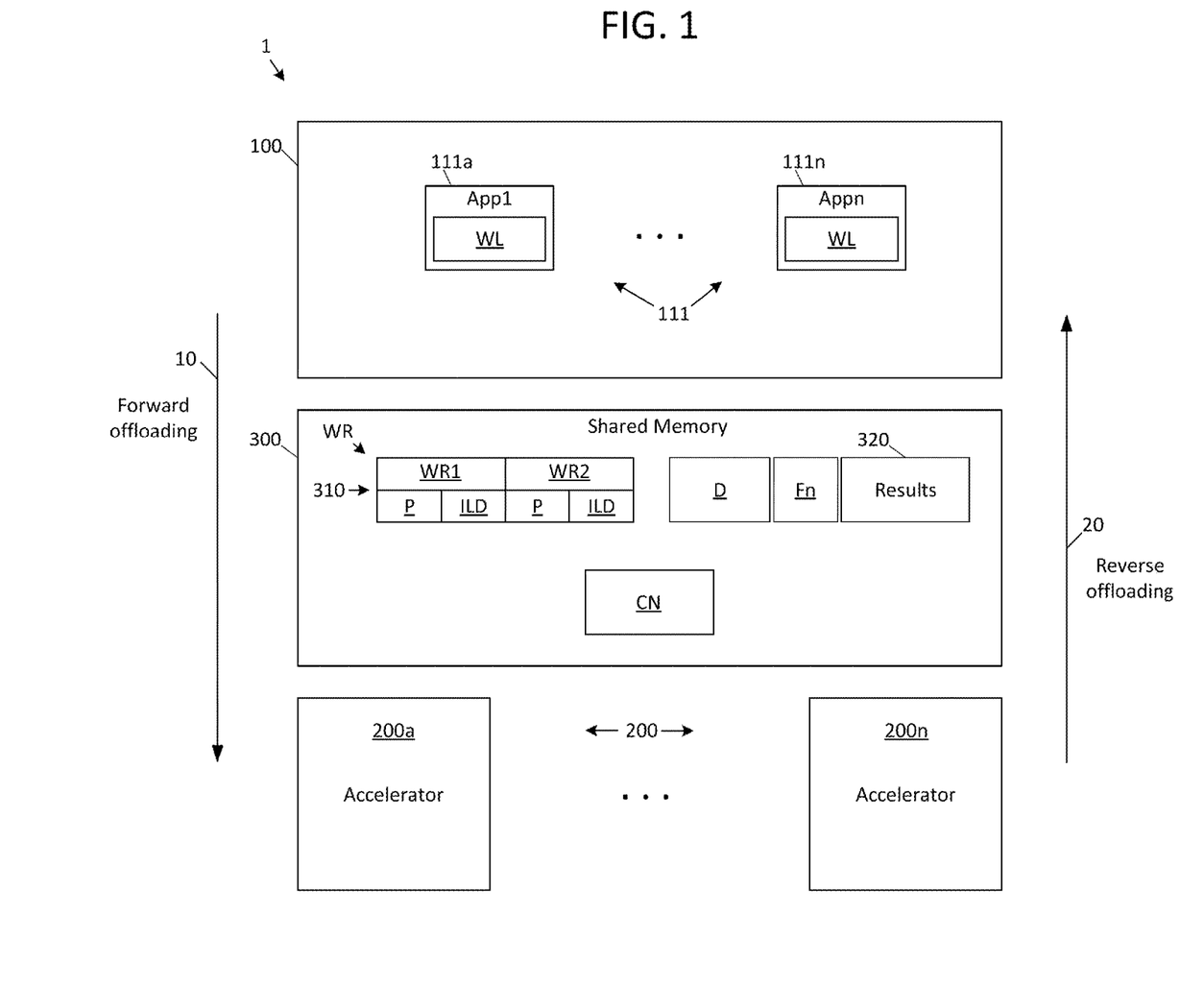
FIG. 1 is a system diagram depicting a system for data processing, according to some embodiments of the present disclosure.

FIG. 1 is a system diagram depicting a system for data processing, according to some embodiments of the present disclosure.

Referring to FIG. 1, a system 1 for data processing may include a host 100, a shared memory 300, and one or more accelerators 200 (e.g., one or more accelerator circuits). In some embodiments, the accelerators may include GPUs. The host 100 may include one or more CPUs and one or more applications 111 running on the computing resources of the host 100. The applications 111 may include a first application 111a and an n-th application 111n (where n is a positive integer). The applications 111 may process workloads WL. For example, one or more workloads WL may include a matrix-multiplication workload. The system 1 may offload work associated with the workloads WL from the CPU of the host 100 to the accelerators 200. The accelerators 200 may include a first accelerator 200a and an n-th accelerator 200n. The accelerators 200 may be specialized to speed up specific computations for processing the workloads WL. For example, the accelerators 200 may be specialized at performing matrix-multiplication operations on tiles (e.g., sub-matrices) of a larger matrix-multiplication workload. For example, the first accelerator 200a may process a first tile, and the n-th accelerator 200n may process an n-th tile for the host 100. The accelerators 200 may process work for the host 100, and the host 100 may combine results generated by the accelerators 200. In some embodiments, the accelerators 200 may be subordinate to the host 100 within the system 1. For example, the host 100 may generate work requests WR based on a large workload to cause the accelerators 200 to assist by processing smaller tasks associated with processing the large workload. In other words, the host 100 may have more control over the accelerators 200 than the accelerators have over the host 100.

The host 100 may be capable of performing relatively complicated instructions more efficiently than the accelerators 200. On the other hand, the accelerators 200 may be capable of performing simple instructions more efficiently than the host 100. Accordingly, the system 1 may allow for forward offloading 10 and reverse offloading 20 to process a given workload WL more efficiently. As used herein, "forward offloading" refers to distributing work from the host 100 to one or more of the accelerators 200. As used herein, "reverse offloading" refers to distributing work from one or more of the accelerators 200 to the host 100. In some embodiments, some instructions or code segments, associated with a work request WR, may be reverse offloaded based on the instructions or code segments including branchy code (e.g., branch-containing code), system calls, exceptions, and/or network messages. As used herein, "branchy code" refers to code including two or more different instruction sequences (e.g., branches) therein. As used herein, a "system call" refers to a request from an accelerator 200 to an operating system of the system 1 to invoke a service provided by the operating system. As used herein, an "exception" refers to an event that disrupts a normal processing flow of instructions. As used herein, a "network message" refers to data transmitted over a network associated with the system 1 to communicate information between a source component and a destination component.

The shared memory 300 may be a physical memory that is common to both the host 100 and the accelerators 200. For example, the CPU(s) of the host 100 and the accelerators 200 may both have load access and store access to the shared memory 300. The CPU(s) of the host 100 and the accelerators 200 may share the same virtual memory. Accordingly, virtual memory translations between the CPU(s) of the host 100 and the accelerators 200 of the system 1 may result in the same physical memory location in the shared memory 300. Accordingly, in contrast to a system including the host 100 being loosely coupled with the accelerators via a network connection (e.g., a peripheral component interconnect express (PCIe) bus), the CPU(s) of the host 100 and the accelerators 200 of the present disclosure may be coupled (e.g., tightly coupled) by way of the shared memory 300. The shared memory 300 may include a cacheable memory. As used herein, "cacheable memory" is memory (e.g., volatile memory) that may be used to store data for quicker access than with a non-volatile memory. In some embodiments the shared memory 300 may include a high-bandwidth memory (HBM). For example, the shared memory 300 may include stacked memory dies for relatively high bandwidth with a relatively small form factor that consumes less power.

The host 100 may provide instructions to the accelerators 200 via the shared memory 300. The host 100 may provide instructions to the accelerators by way of a work-request queue 310 in the shared memory 300. The work-request queue 310 may include work requests WR (e.g., a first work request WR1 and a second work request WR2). Each work request WR may include one or more pointers P. The pointers P may indicate locations in the shared memory 300 where relevant data D, relevant functions Fn, and/or relevant results 320 (e.g., work-request result data), associated with a work request WR, are stored. The relevant data D may include input arguments and/or other data for performing work associated with the work request WR. The relevant functions Fn may be associated with one or more operations associated with the work requests WR. The work requests WR may include in-line data ILD for performing the work associated with the work requests WR. The in-line data ILD may include in-line operands (e.g., media operands) for performing the work associated with the work requests WR.

The accelerators 200 may read the work requests from the work-request queue 310 to perform the work distributed to the accelerators 200. The accelerators 200 may provide a completion notification CN based on completing a given work request WR and/or based on completing an operation associated with the given work request WR. The accelerators may store results 320 of a given work request WR in the shared memory 300. In some embodiments, each accelerator 200 may have its own queue (e.g., its own memory-mapped queue). For example, the shared memory 300 may include more than one work-request queue 310, and each work-request queue 310 may correspond to a respective accelerator 200. In some embodiments, each accelerator 200 may have its own partition of a shared queue. For example, the shared memory 300 may include one or more work-request queues 310 respectively serving more than one accelerator 200.

In some embodiments, the work-request queue 310 may be a circular queue having fixed-length slots. Each of the work requests WR may include a kernel (e.g., a compute kernel) for performing work associated with the work requests WR. As used herein, a "compute kernel" is an accelerator routine including input data for an accelerator to use in generating output data. In some embodiments, the host 100 may be a reduced instruction set computer-five (RISC-V) host, and the accelerators 200 may be RISC-V devices. RISC-V may allow for easier use of instructions to distribute work between the host 100 and the accelerators 200.

In some embodiments, the system 1 may operate based on a work-submission control protocol implemented in hardware, firmware, and host software. The host 100 and the accelerators 200 may use the work-submission control protocol to submit compute kernels and to receive completion notifications CN. In some embodiments, the host 100 may register the work-request queue 310 with the accelerators 200 with a "register_queue" instruction. For example, the register_queue instruction may include register_queue <address>, wherein <address> is a virtual memory address of the work-request queue 310. In some embodiments, work-submission instructions associated with each work request WR may include a descriptor that allows the CPU of the host 100 to specify to a given accelerator 200 which compute kernels are to be executed on the given accelerator 200. For example, a "submit" instruction associated with a given work request WR may have the format: submit <index><size>, wherein <index> is an index in the work-request queue 310 for new work, associated with the given work request WR, and <size> represents how many slots in the work-request queue 310 are associated with the given work request WR.

In some embodiments, the accelerators 200 may include device firmware that interprets the work requests WR and implements device portions of the associated protocol. In some embodiments, host software may include user-mode drivers and kernel-device drivers, which run on the host 100. The user-mode drivers and kernel-device drivers may implement work-submission protocols and provide the instructions to submit work to the tightly coupled accelerators 200.

In some embodiments, the shared memory 300 may be used as a shared cache. For example, the system 1 may enable fast data processing by big cores (e.g., high-performance cores) of the CPU(s) of the host 100 and by little cores (e.g., low-power cores and/or low-complexity cores) of the accelerators 200. For example, synchronization constructs (e.g., synchronization registers) or active messages may be used to directly write data for processing by the big cores of the host 100 and the little cores of the accelerators 200. In some embodiments, the little cores of the accelerators 200 may act like a last-level cache for the big cores of the host 100. Accordingly, the system 1 may provide low latency interactions between hosts and devices. For example, the system 1 may perform compute-kernel offloading and shared-cache data processing between the host 100 and the accelerators 200 with reduced latencies compared to loosely coupled host-accelerator systems.

As an example, the system 1 may process workload instructions as follows. The host 100 may register the work-request queue 310 with the first accelerator 200a in the shared memory 300. The host 100 may initiate a forward offload by generating the first work request WR1 in the work-request queue 310 based on the first application 111a processing the workload WL. The first work request WR1 may include pointers P identifying locations of the relevant data D and the relevant functions Fn for performing the first work request WR1. The first accelerator 200a may read the first work request WR1 from the work-request queue 310 in the shared memory 300. The first accelerator 200a may use the relevant data D and the relevant function Fn to generate first results (e.g., first work-request result data) in the results 320 of the shared memory 300. For example, the first accelerator 200a may perform an operation on the data D in the shared memory 300 based on the first work request WR1. The first accelerator 200a may generate the completion notification CN in the shared memory 300 to notify the host 100 that the first work request WR1 or a first operation associated with the first work request WR1 is complete. For example, if the first work request WR1 includes branchy code, the first accelerator 200a may generate a completion notification CN indicating that a first branch of the branchy code is complete. The completion notification CN may be associated with reverse-offloading instructions (e.g., a reverse-offload request). The reverse-offloading instructions may cause the host 100 to perform a second branch of the branchy code.

The host 100 may use the relevant results 320 provided by the first accelerator 200a to continue processing the workload WL. For example, the host 100 may combine the relevant results (e.g., the relevant results including the first work-request result data) of the first accelerator 200a and the n-th accelerator 200n to process the workload WL. For example, the host 100 may process the first work-request result data from the first accelerator 200a and may process n-th work-request result data from the n-th accelerator 200n to process the workload WL.

Figure 2:
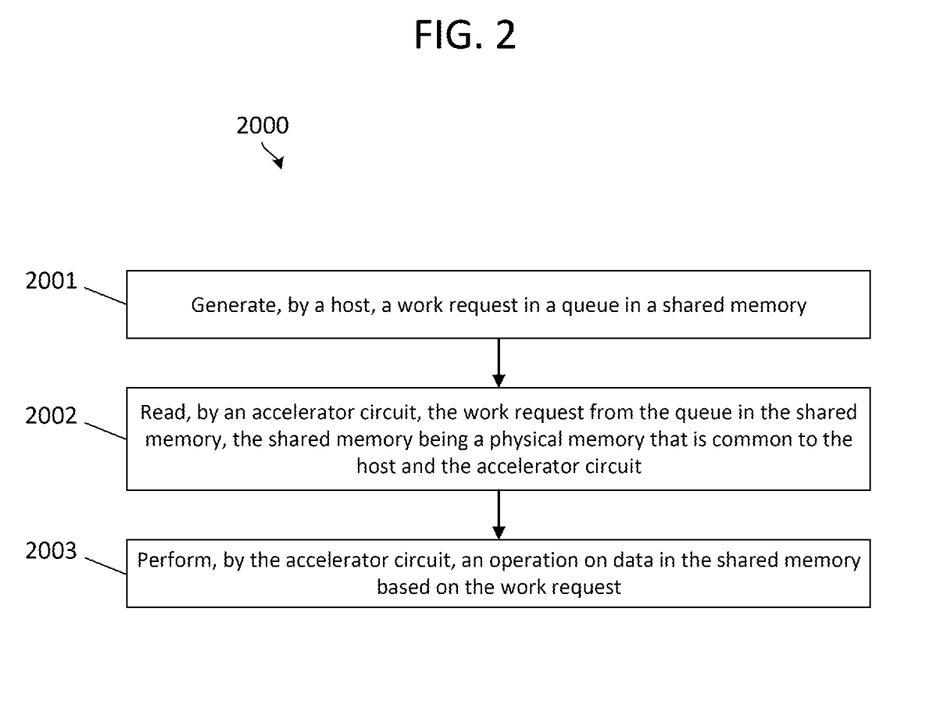
FIG. 2 is a flowchart depicting example operations of a method for data processing, according to some embodiments of the present disclosure.

FIG. 2 is a flowchart depicting example operations of a method for data processing, according to some embodiments of the present disclosure.

Referring to FIG. 2, the method 2000 may include the following example operations. A host 100 (see FIG. 1) may generate a work request WR in a work-request queue 310 in a shared memory 300 (operation 2001). An accelerator 200 may read the work request WR from the work-request queue 310 in the shared memory 300 (operation 2002). The shared memory 300 may be a physical memory that is common to both the host 100 and the accelerator 200 (operation 2002). The accelerator 200 may perform an operation on data in the shared memory 300 based on the work request WR (operation 2003). For example, the accelerator 200 may perform a matrix-multiplication operation on a tile (e.g., a sub-matrix) of a larger matrix-multiplication workload (operation 2003). Because the data is processed in the shared memory 300, a system 1 may process the data with a lower latency than processing the data in a location that is not common to the host 100 and the accelerator 200 (e.g., processing the data, by the host 100, in a first location associated with the host 100 and processing the data, by the accelerator 200, in a second location associated with the accelerator 200).

Accordingly, aspects of some embodiments of the present disclosure may provide improvements to computing by reducing latencies in distributing work and/or processing data within a host-accelerator system using a shared common physical memory.

Example embodiments of the disclosure may extend to the following statements, without limitation:

Statement 1. An example method includes: generating, by a host, a work request in a queue in a shared memory, reading, by an accelerator circuit, the work request from the queue in the shared memory, the shared memory being a physical memory that is common to the host and the accelerator circuit, and performing, by the accelerator circuit, an operation on data in the shared memory based on the work request.

Statement 2. An example method includes the method of statement 1, wherein a latency associated with processing the data in the shared memory by the host and by the accelerator circuit is less than a total latency associated with processing the data, by the host, in a first location associated with the host and processing the data, by the accelerator circuit, in a second location associated with the accelerator circuit.

Statement 3. An example method includes the method of any of statements 1 and 2, wherein the work request includes a pointer indicating a location of a function in the shared memory, the function being associated with the operation, and the accelerator circuit performs the function to process the work request.

Statement 4. An example method includes the method of any of statements 1-3, wherein the work request includes a pointer indicating a location of the data in the shared memory, and the accelerator circuit performs the function on the data to process the work request.

Statement 5. An example method includes the method of any of statements 1-4, wherein the work request includes a compute kernel.

Statement 6. An example method includes the method of any of statements 1-5, wherein the shared memory includes cacheable memory including high-bandwidth memory (HBM).

Statement 7. An example method includes the method of any of statements 1-6, wherein the accelerator circuit is a first accelerator circuit of two or more accelerator circuits that process work requests generated by the host, and the method further includes processing, by the host, work-request result data from the first accelerator circuit, and processing, by the host, work-request result data from a second accelerator circuit of the two or more accelerator circuits.

Statement 8. An example method includes the method of any of statements 1-7, further including generating, by the accelerator circuit, a completion notification in the shared memory.

Statement 9. An example method includes the method of any of statements 1-8, further including processing, by the host, a reverse offload request from the accelerator circuit based on the work request being associated with at least one of branchy code, a system call, an exception, or a network message.

Statement 10. An example system for performing the method of any of statements 1-9 includes a host, an accelerator circuit, and a shared memory communicably coupled to the host and to the accelerator circuit.

Statement 11. An example device includes a processing circuit, and memory storing instructions, which, when executed by the processing circuit, cause the processing circuit to perform the method of any of statements 1-9.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims and their equivalents.

What is claimed is:

1. A method for data processing, the method comprising:
generating, by a host, a work request in a queue in a shared memory, the work request being associated with at least one of branchy code, a system call, an exception, or a network message;
reading, by an accelerator circuit, the work request from the queue in the shared memory, the shared memory being a physical memory that is common to the host and the accelerator circuit;
performing, by the accelerator circuit, an operation on data in the shared memory based on the work request by performing a function, associated with the operation, on the data, the function being located in the shared memory and being identified by the work request; and processing, by the host, a reverse offload request from the accelerator circuit based on the work request being associated with the at least one of the branchy code, the system call, the exception, or the network message.

2. The method of claim 1, wherein a latency associated with processing second data in the shared memory by the host and by the accelerator circuit is less than a total latency associated with processing the second data, by the host, in a first location associated with the host and processing the second data, by the accelerator circuit, in a second location associated with the accelerator circuit, the first location and the second location being coupled via a network connection, at least one of the first location or the second location being external to the shared memory, the processing of the second data in the shared memory by the host and by the accelerator circuit comprising performing, by the host, a first task associated with the operation, and performing, by the accelerator circuit, the function, the processing of the second data, by the host, in the first location comprising performing, by the host, the first task associated with the operation in the first location, and the processing of the second data, by the accelerator circuit, in the second location comprising performing, by the accelerator circuit, the function in the second location.

3. The method of claim 1, wherein:
the work request comprises a pointer indicating a location of a function in the shared memory, the function being associated with the operation; and
the accelerator circuit performs the function to process the work request.

4. The method of claim 3, wherein:
the work request comprises a pointer indicating a location of the data in the shared memory; and
the accelerator circuit performs the function on the data to process the work request.

5. The method of claim 1, wherein the work request comprises a compute kernel.

6. The method of claim 1, wherein the shared memory comprises cacheable memory comprising high-bandwidth memory (HBM).

7. The method of claim 1, wherein the accelerator circuit is a first accelerator circuit of two or more accelerator circuits that process work requests generated by the host; and
the method further comprises:
processing, by the host, work-request result data from the first accelerator circuit; and
processing, by the host, work-request result data from a second accelerator circuit of the two or more accelerator circuits.

8. The method of claim 1, further comprising generating, by the accelerator circuit, a completion notification in the shared memory.

9. The method of claim 1, further comprising processing, by the host, a reverse offload request from the accelerator circuit based on the work request being associated with at least one of branchy code, a system call, an exception, or a network message.

10. A system for data processing, comprising:
a host;
an accelerator circuit; and
a shared memory communicably coupled to the host and to the accelerator circuit, wherein:
the host is configured to generate a work request in a queue in the shared memory, the work request being associated with at least one of branchy code, a system call, an exception, or a network message;
the accelerator circuit is configured to read the work request from the queue in the shared memory, the shared memory being a physical memory that is common to the host and the accelerator circuit;
the accelerator circuit is configured to perform an operation on data in the shared memory based on the work request by performing a function, associated with the operation, on the data, the function being located in the shared memory and being identified by the work request; and
the host is configured to process a reverse offload request from the accelerator circuit based on the work request being associated with the at least one of the branchy code, the system call, the exception, or the network message.

11. The system of claim 10, wherein:
the work request comprises a pointer indicating a location of a function in the shared memory, the function being associated with the operation; and
the accelerator circuit performs the function to process the work request.

12. The system of claim 11, wherein:
the work request comprises a pointer indicating a location of the data in the shared memory; and
the accelerator circuit performs the function on the data to process the work request.

13. The system of claim 10, wherein the work request comprises a compute kernel.

14. The system of claim 10, wherein the shared memory comprises cacheable memory comprising high-bandwidth memory (HBM).

15. The system of claim 10, wherein:
the accelerator circuit is a first accelerator circuit of two or more accelerator circuits that process work requests generated by the host; and
the host is configured to:
process work-request result data from the first accelerator circuit; and
process work-request result data from a second accelerator circuit of the two or more accelerator circuits.

16. The system of claim 10, wherein the accelerator circuit is configured to generate a completion notification in the shared memory.

17. The system of claim 10, wherein the host is configured to process a reverse-offload request from the accelerator circuit based on the work request being associated with at least one of branchy code, a system call, an exception, or a network message.

18. A device for data processing, comprising:
a processing circuit; and
memory storing instructions:
which, when executed by the processing circuit, cause the processing circuit to perform:
reading a work request, generated by a host, from a queue in a shared memory, the shared memory being a physical memory that is common to the host and the processing circuit, and the work request being associated with at least one of branchy code, a system call, an exception, or a network message; and performing an operation on data in the shared memory based on the work request by performing a function, associated with the operation, on the data, the function being located in the shared memory and being identified by the work request; and which, when executed by the host, cause the host to perform:
processing a reverse offload request based on the work request being associated with the at least one of the branchy code, the system call, the exception, or the network message.

19. The device of claim 18, wherein:
the work request comprises a pointer indicating a location of a function in the shared memory, the function being associated with the operation; and
the processing circuit performs the function to process the work request.

20. The device of claim 19, wherein:
the work request comprises a pointer indicating a location of the data in the shared memory; and
the processing circuit performs the function on the data to process the work request.

\* \* \* \* \*